(12) United States Patent
Takeda et al.

(10) Patent No.: US 11,150,148 B2
(45) Date of Patent: Oct. 19, 2021

(54) OPTICAL FIBER DETECTING DEVICE AND METHOD FOR DETECTING MECHANICAL STRAIN USING OPTICAL FIBER DETECTING DEVICE

(71) Applicant: MITSUBISHI HEAVY INDUSTRIES, LTD., Tokyo (JP)

(72) Inventors: Hiroki Takeda, Tokyo (JP); Yoshihide Wadayama, Tokyo (JP); Ryo Kawabata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/786,003

(22) Filed: Feb. 10, 2020

(65) Prior Publication Data

US 2021/0116314 A1   Apr. 22, 2021

(30) Foreign Application Priority Data

Oct. 18, 2019   (JP) .............................. JP2019-191305

(51) Int. Cl.
*G01L 1/24*   (2006.01)
*G01K 11/32*   (2021.01)

(52) U.S. Cl.
CPC .............. *G01L 1/242* (2013.01); *G01K 11/32* (2013.01)

(58) Field of Classification Search
None
See application file for complete search history.

(56) References Cited

U.S. PATENT DOCUMENTS 5,594,819 A * 1/1997 Narendran ............. G01B 11/18
250/227.14
2006/0001863 A1 * 1/2006 Kishida .................. G01D 11/30
356/136

FOREIGN PATENT DOCUMENTS

| JP | 2006-194704 | 7/2006 |
| JP | 2006-276187 | 10/2006 |
| JP | 2009-281789 | 12/2009 |

* cited by examiner

*Primary Examiner* — Chris H Chu
(74) *Attorney, Agent, or Firm* — Wenderoth, Lind & Ponack, L.L.P.

(57) ABSTRACT

An optical fiber detecting device includes: an optical fiber configured to extend in contact with a surface of an object to be measured; a metal covering configured to cover a part of the optical fiber in an extending direction of the optical fiber from an outside of the object to be measured; a fixing section configured to fix an inner surface of the metal covering and the optical fiber; and welding sections configured to fix the metal covering to the object to be measured at positions interposing the optical fiber in a direction intersecting the extending direction of the optical fiber.

6 Claims, 5 Drawing Sheets

OPTICAL FIBER DETECTING DEVICE AND METHOD FOR DETECTING MECHANICAL STRAIN USING OPTICAL FIBER DETECTING DEVICE

BACKGROUND OF THE INVENTION

Field of the Invention

The present disclosure relates to an optical fiber detecting device and a method for detecting a mechanical strain using the optical fiber detecting device.

Priority is claimed on Japanese Patent Application No. 2019-191305, filed Oct. 18, 2019, the content of which is incorporated herein by reference.

Description of Related Art

For example, mechanical devices such as gas turbines having a high-temperature working fluid flowing therein, the occurrence of a strain (thermal deformation) in each part due to heat input during an operation is known. As a technology for quantitatively detecting such a strain, methods using an optical fiber (an OFDR method and an FBG method) have been put to practical use. For example, in an OFDR method, an optical fiber is used while attached to an object to be measured (a blade of a turbine and a vehicle compartment). If a temperature of an object to be measured is raised, an optical fiber itself expands and contracts on the basis of a change in thermal expansion/refractive index of the optical fiber itself and the expansion (thermal expansion/mechanical strain) of a turbine. A laser enters an optical fiber from one end thereof in a longitudinal direction and Rayleigh scattered light is generated from each part of the optical fiber. This Rayleigh scattered light is detected as reflected light from each part. At this time, an amount of wavelength to shift in each part of the optical fiber is obtained by comparing reference light serving as a reference with the scattered light. This amount of wavelength to shift (a detection value using the optical fiber) is a function showing a relationship between a component affected by a temperature of the optical fiber itself and expansion of an object to be measured. It is possible to obtain an expansion (a strain) from a temperature of the object to be measured on the basis of this function. In the related art, an optical fiber is generally fixed to a surface of an object to be measured using an adhesive.

Patent Document

Patent Document 1: Japanese Unexamined Patent Application, First Publication No. 2006-276187

SUMMARY OF THE INVENTION

However, adhesives in which a stable adhesive performance is exhibited with respect to surfaces of mechanical devices such as gas turbines which are in a high temperature state have not been realized at present or are difficult to obtain. As a result, it may be difficult to maintain detection accuracy in some cases. Therefore, a more stable technique is required as a fixing means instead of an adhesive and there is increasing demand for a technique capable of performing detection with higher accuracy with a detecting device.

The present disclosure was made to solve the above-described problems, and an object of the present disclosure is to provide an optical fiber detecting device which is able to be more stably laid and capable of performing detection with higher accuracy and a method for detecting a mechanical strain using the optical fiber detecting device.

In order to accomplish the above-mentioned object, an optical fiber detecting device according to the present disclosure includes: an optical fiber configured to extend in contact with a surface of an object to be measured; a metal covering configured to cover a part of the optical fiber in an extending direction of the optical fiber from an outside of the object to be measured; a fixing section configured to fix an inner surface of the metal covering and the optical fiber; and welding sections configured to fix the metal covering and the object to be measured at positions interposing the optical fiber in a direction intersecting the extending direction of the optical fiber.

According to the present disclosure, it is possible to provide an optical fiber detecting device which is able to be more stably laid and capable of performing detection with higher accuracy and a method for detecting a mechanical strain using the optical fiber detecting device.

DETAILED DESCRIPTION OF THE INVENTION

First Embodiment (Constitution of Optical Fiber Detecting System)

Figure 1:
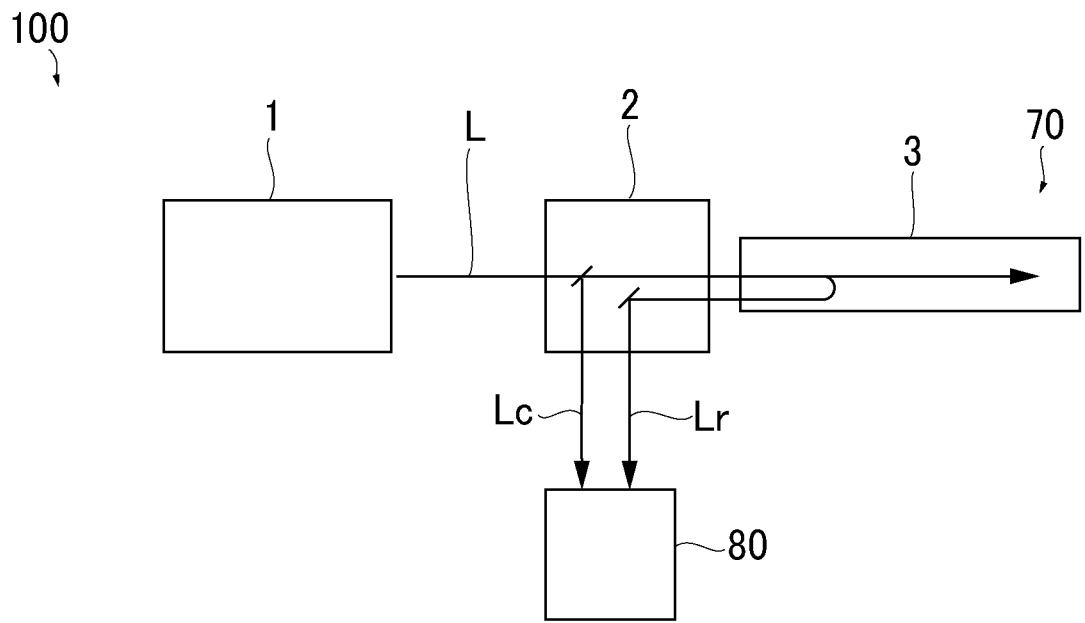
FIG. 1 is a schematic diagram showing a constitution of an optical fiber detecting system according to a first embodiment of the present disclosure.
Figure 2:
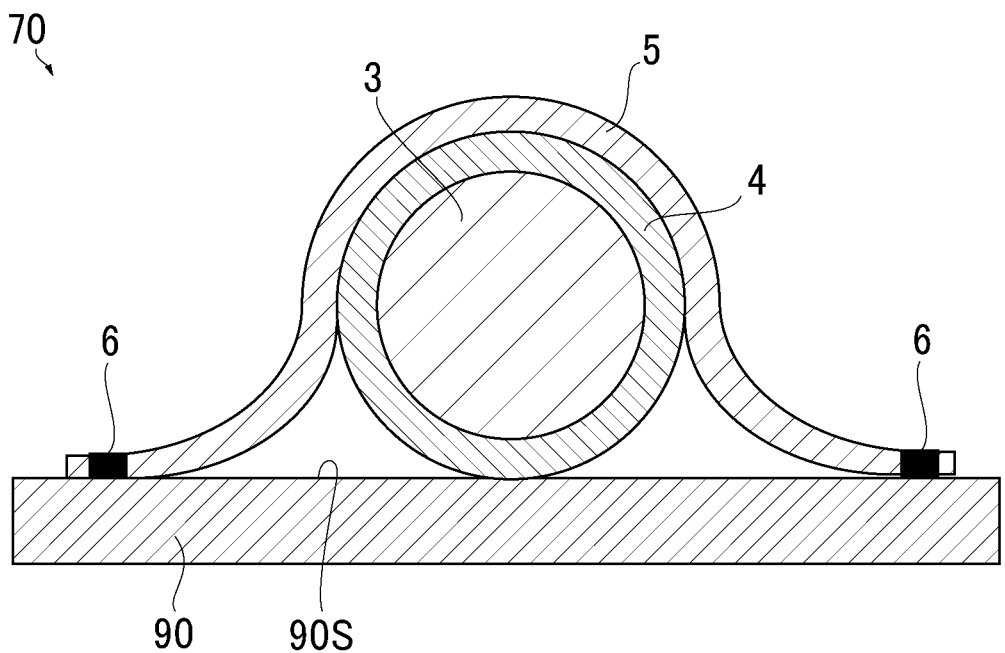
FIG. 2 is a cross-sectional view showing a constitution of an optical fiber detecting device according to the first embodiment of the present disclosure.

An optical fiber detecting system 100 according to a first embodiment of the present disclosure will be described below with reference to FIGS. 1 and 2. The optical fiber detecting system 100 is used, for example, for detecting a strain occurring in a high-temperature member including a combustor of a gas turbine and a turbine. As shown in FIG. 1, the optical fiber detecting system 100 includes a light source 1, a spectroscope 2, an optical fiber detecting device 70 containing an optical fiber 3, and a detecting device 80. The light source 1 generates a laser L. The spectroscope 2 is provided on a path of the laser L. A plurality of galvanometers are provided inside the spectroscope 2. Furthermore, the optical fiber 3 is connected to the spectroscope 2 and the laser L travels through the optical fiber 3 with the spectroscope 2 therebetween.

As will be described in detail later, the optical fiber 3 is laid in an arbitrary section (a high-temperature part) of a gas turbine as an object 90 to be measured. When a temperature of a surface of the object 90 to be measured changes, scattered light Lr due to Rayleigh scattering is generated inside the optical fiber 3. The scattered light Lr returns to the spectroscope 2 through the inside of the optical fiber 3. The scattered light Lr goes through the above-described galvanometers in the spectroscope 2, a direction of the scattered light Lr changes, and then the scattered light Lr reaches the detecting device 80. In addition, as in the scattered light Lr, a direction of a part of the laser L before entering the optical fiber 3 changes using the other galvanometers and the laser L reaches the detecting device 80 as reference light Lc. In the detecting device 80, an amount of wavelength to shift of the scattered light Lr is obtained by comparing the physical properties of the scattered light Lr and the reference light Lc. This amount of wavelength to shift is a function in which an influence of temperature change of an optical fiber itself and expansion (a strain) and the like of the object 90 to be measured are used as variables. That is to say, a strain of the object 90 to be measured is obtained on the basis of the amount of wavelength to shift.

(Constitution of Optical Fiber Detecting Device)

A constitution of the optical fiber detecting device 70 will be described below with reference to FIG. 2. As shown in FIG. 2, the optical fiber detecting device 70 includes the optical fiber 3, a metal covering 5, a fixing section 4, and welding sections 6. The optical fiber 3 extends in an arbitrary length in a state of being in contact with a surface 90S of the object 90 to be measured. The metal covering 5 is a metal component formed in a thin plate shape and covers a part of the optical fiber 3 in the extending direction of the optical fiber 3 from an outside of the object 90 to be measured (the surface 90S). The fixing section 4 fixes an inner surface of the metal covering 5 to the optical fiber 3. An outer surface of the optical fiber 3 is covered with a metal film made of gold or the like. The fixing section 4 fixes the metal film to the inner surface of the metal covering 5 using brazing or soldering. That is to say, the fixing section 4 is formed through solidification of a molten brazing filler metal or solder. Furthermore, an edge of the metal covering 5 (that is, a portion which comes into contact with the surface 90S) is fixed to the surface 90S using the welding sections 6 formed through spot welding or the like. In other words, the welding sections 6 are provided at positions interposing the optical fiber 3 from both sides in a direction intersecting the extending direction of the optical fiber 3.

(Action Effects)

According to the above constitution, the inner surface of the metal covering 5 is fixed to the optical fiber 3 through the fixing section 4 and the metal covering 5 is fixed to the object 90 to be measured through the welding sections 6. Thus, it is possible to more firmly fix the optical fiber 3 by pressing the optical fiber 3 against the surface 90S of the object 90 to be measured. On the other hand, in the related art, in this type of device, an optical fiber is generally fixed to an object to be measured using an adhesive. According to the above constitution, it is possible to more firmly and stably fix the optical fiber 3 to the object 90 to be measured than when such an adhesive is used. As a result, it is possible to detect a strain using the optical fiber detecting device 70 and the optical fiber detecting system 100 with higher accuracy.

Second Embodiment

Figure 3:
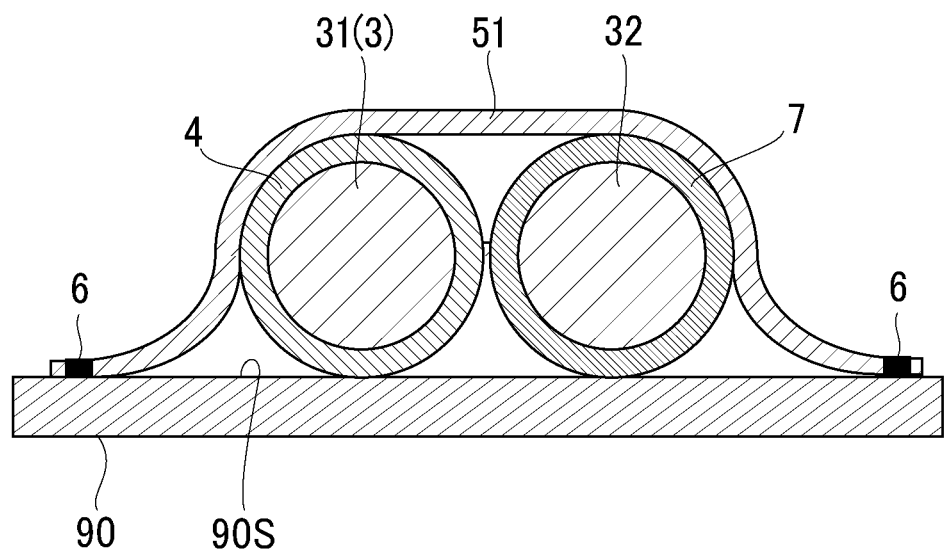
FIG. 3 is a cross-sectional view showing a constitution of an optical fiber detecting device according to a second embodiment of the present disclosure.

A second embodiment of the present disclosure will be described below with reference to FIG. 3. Constituent elements of the second embodiment that are the same as those of the first embodiment will be denoted with the same reference numerals as in the first embodiment and detailed description thereof will be omitted. As shown in FIG. 3, in this embodiment, another optical fiber (an optical fiber 32 for linear expansion measurement) is laid inside a metal covering 51 in addition to an optical fiber 3 as a main fiber 31. The optical fiber 32 for linear expansion measurement is covered with the metal covering 51 from the outside so that a heat-conductive holding section 7 formed in a tubular shape and made of a material having heat conductivity is formed between the optical fiber 32 for linear expansion measurement and the metal covering 51. In addition, as the heat-conductive holding section 7, it is possible to utilize a heat-conductive cement to increase heat conductivity or to utilize a heat-insulating cement to reduce an influence of the outside air. Furthermore, the optical fiber 32 for linear expansion measurement is laid above the surface 90S of the object 90 to be measured such that the optical fiber 32 for linear expansion measurement is parallel to the main fiber 31. The term "parallel" mentioned herein refers to the expression "substantially parallel" and it is assumed that design tolerances and manufacturing errors are allowed. The heat-conductive holding section 7 is not fixed to the optical fiber 32 for linear expansion measurement. That is to say, the optical fiber 32 for linear expansion measurement can thermally expand inside the heat-conductive holding section 7 in a direction in which the optical fiber 32 itself extends.

Here, an optical fiber detecting device 70 detects the following physical quantities. First, a laser L is incident on the optical fiber 3 (the main fiber 31) from a light source 1 provided at one end thereof in a direction in which the optical fiber 3 extends. The laser L generates Rayleigh scattered light Lr in each part of the optical fiber 3. An amount of wavelength to shift in each part of the optical fiber 3 is obtained by detecting the scattered light Lr using a detecting device 80 and comparing the detected scattered light Lr with reference light Lc serving as a reference. This amount of wavelength to shift is a function in which linear expansion due to temperature change of the optical fiber 3 itself, expansion (a strain) of the object 90 to be measured, and the like are used as variables. To be more specific, the amount of wavelength to shift includes A to C which will be described below:

A. An amount of response change based on a linear expansion difference between an object to be measured and an optical fiber;

B. An amount of response change due to temperature change of an optical fiber (that is a sum of an amount of response change due to thermal expansion of an optical fiber and an amount of response change due to a refractive index change); and C. A mechanical strain of an object to be measured.

When the optical fiber 3 is fixed to the object 90 to be measured, a value obtained by summing A, B, and C described above is detected as an amount of wavelength to shift. That is to say, it is difficult to obtain only a mechanical strain in C. Thus, the optical fiber detecting device 70 according to this embodiment further includes the optical fiber 32 for linear expansion measurement in addition to the optical fiber 3 as the main fiber 31. The optical fiber 32 for linear expansion measurement is attached in a state in which at least a part thereof allows only its own thermal expansion (that is, B described above) based on temperature change of the object 90 to be measured. To be specific, as described above, the optical fiber 32 for linear expansion measurement can freely thermally expand inside the heat-conductive holding section 7.

Here, if an input to the optical fiber 32 for linear expansion measurement is only a temperature, an amount of wavelength to shift is a function of only the temperature. For this reason, it is possible to acquire a temperature of the object 90 to be measured from B described above using this function. Furthermore, it is possible to also calculate A. An amount of response change based on the linear expansion difference between the object 90 to be measured and the optical fiber 3 input to the optical fiber 3 on the basis of the temperature. It is possible to obtain C A mechanical strain of the object to be measured by subtracting the sum of the amounts of response change of A and B obtained in this way from the amounts of wavelength to shift (the sum of A, B, and C) obtained using the optical fiber 3. That is to say, it is possible to accurately obtain only a mechanical strain of the object 90 to be measured in a state in which an influence (thermal expansion) due to temperature change of the optical fiber 3 itself is excluded. Thus, it is possible to further improve measurement accuracy.

Third Embodiment

Figure 4:
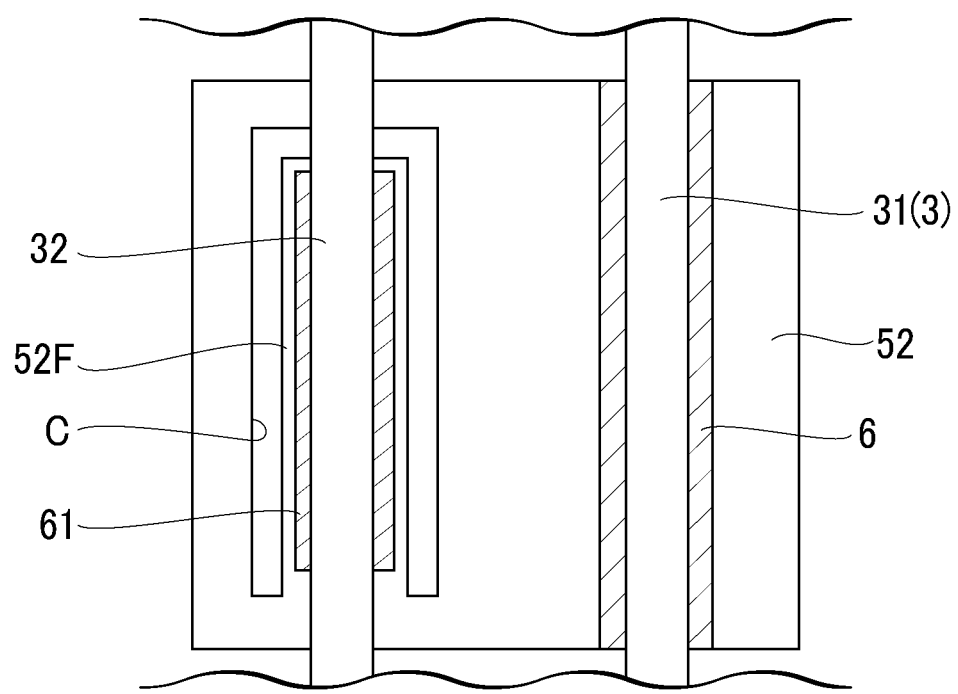
FIG. 4 is a plan view showing a constitution of an optical fiber detecting device according to a third embodiment of the present disclosure.

A third embodiment of the present disclosure will be described below with reference to FIG. 4. Constituent elements of the third embodiment that are the same as those of the first and second embodiments will be denoted with the same reference numerals as in the first and second embodiment and detailed description thereof will be omitted. As shown in FIG. 4, this embodiment is different from the second embodiment in that an aspect of fixing and laying the optical fiber 32 for linear expansion measurement described in this embodiment is different from that of the second embodiment. To be specific, in this embodiment, a metal foil 52 as a metal covering 5 is attached above the surface 90S of the object 90 to be measured. Furthermore, the metal foil 52 is made of, for example, the same material as the object 90 to be measured. The metal foil 52 and the object 90 to be measured do not necessarily need to be made of the same material as long as the metal foil 52 and the object 90 to be measured have the same linear expansion coefficient.

An optical fiber 3 as the above-described main fiber 31 is welded and fixed above the metal foil 52 with a welding sections 6 therebetween. Furthermore, the optical fiber 32 for linear expansion measurement is laid above the metal foil 52 at a distance from the main fiber 31 in a direction intersecting a direction in which the optical fiber 31 extends with respect to the main fiber 31. A portion of the metal foil 52 to which the optical fiber 32 for linear expansion measurement is fixed serves as a free section 52F when covered with a cutout section C having a C shape when viewed in a plan view from the outside. Unlike the other parts of the metal foil 52, the free section 52F is not fixed to the surface 90S of the object 90 to be measured and is in contact with the surface 90S in a displaceable state. The optical fiber 32 for linear expansion measurement is fixed to the free section 52F using the welding sections 61.

Here, as in the above-described second embodiment, A. An amount of response change based on a linear expansion difference between the object 90 to be measured and the optical fiber 3 (the main fiber 31), B. An amount of response change due to temperature change of the optical fiber 3 (that is, a sum of an amount of response change due to thermal expansion of the optical fiber 3 and an amount of response change due to a refractive index change), and C. A mechanical strain of the object 90 to be measured are assumed. According to the above constitution, a portion of the metal foil 52 located between the optical fiber 32 for linear expansion measurement and the object 90 to be measured (the free section 52F) is in contact with the surface 90S of the object 90 to be measured in a displaceable state. Therefore, the optical fiber 32 for linear expansion measurement is in a state in which only its own thermal expansion based on temperature change of the object 90 to be measured is allowed. Here, it is assumed that an amount of response change due to a linear expansion difference between the object 90 to be measured and the metal foil 52 is A1 and an amount of response change due to a linear expansion difference between the metal foil 52 and the optical fiber 3 is A2. Thus, an input to the optical fiber 32 for linear expansion measurement is a sum of A2 and B. An amount of response change due to temperature change of an optical fiber. On the other hand, an input to the optical fiber 3 is a sum of A. An amount of response change based on a linear expansion difference between the object 90 to be measured and the optical fiber 3, B. An amount of response change due to temperature change of the optical fiber 3 (that is, a sum of an amount of response change due to thermal expansion of the optical fiber 3 and an amount of response change due to a refractive index change), and C. A mechanical strain of the object 90 to be measured. That is to say, a relationship of the following Expressions (1) and (2) is established:

$$(\text{Input to optical fiber}) = A + B + C \quad (1)$$

$$(\text{Input to optical fiber for linear expansion measurement}) = A2 + B \quad (2).$$

Here, if a difference between Expression (1) and Expression (2) is obtained, the following Expression (3) is obtained:

$$\text{Expression (1)} - \text{Expression (2)} = (A + B + C) - (A2 + B) \quad (3)$$
$$= C + (A - A2).$$

Since A−A2=A1 is obtained from the above definition, a relationship of Expression (4) is established:

$$C + (A - A2) = C + A1 \quad (4).$$

Since the metal foil 52 and the object 90 to be measured are made of the same material in the above constitution, A1 (the amount of response change due to the linear expansion difference between the object to be measured and the metal cover) is zero. That is to say, it is possible to obtain a value of C from Expression (4) by obtaining a difference between Expression (1) and Expression (2) as described above. In this way, it is possible to accurately obtain only a mechanical strain of the object 90 to be measured by comparing an amount of response due to the optical fiber 32 for linear expansion measurement with an amount of response due to the optical fiber 3.

Fourth Embodiment

Figure 5:
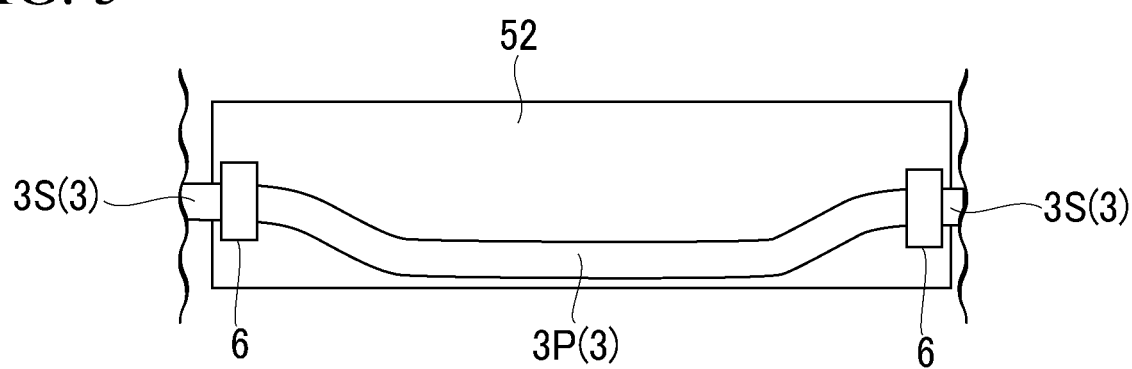
FIG. 5 is a plan view showing a constitution of an optical fiber detecting device according to a fourth embodiment of the present disclosure.
Figure 6:
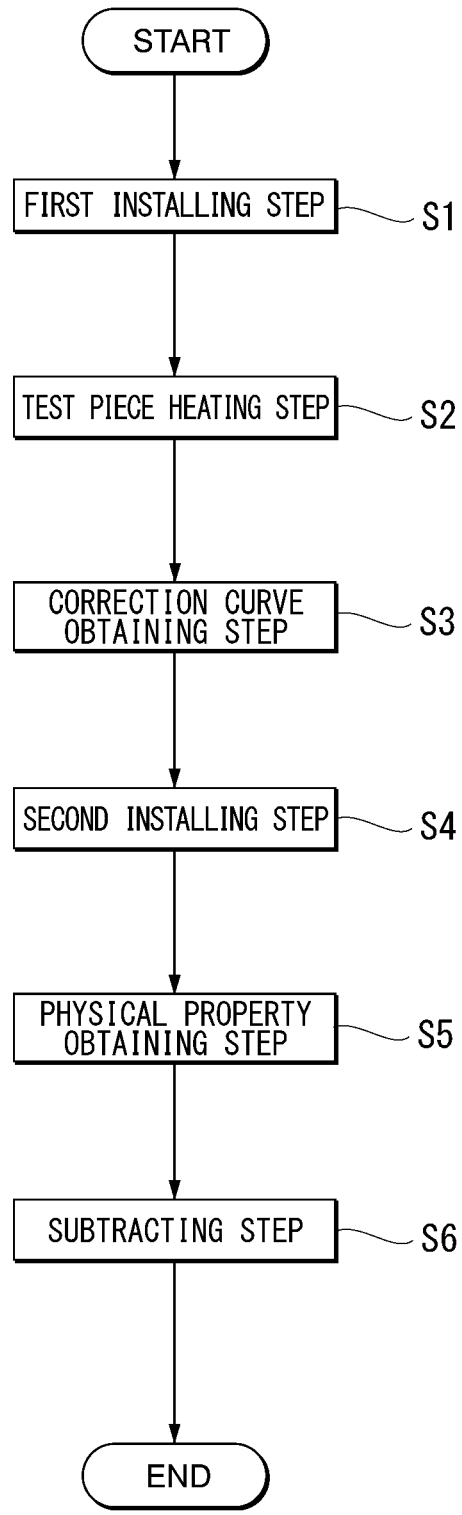
FIG. 6 is a flowchart for describing each step of a method for detecting a mechanical strain using the optical fiber detecting device according to the fourth embodiment of the present disclosure.
Figure 7:
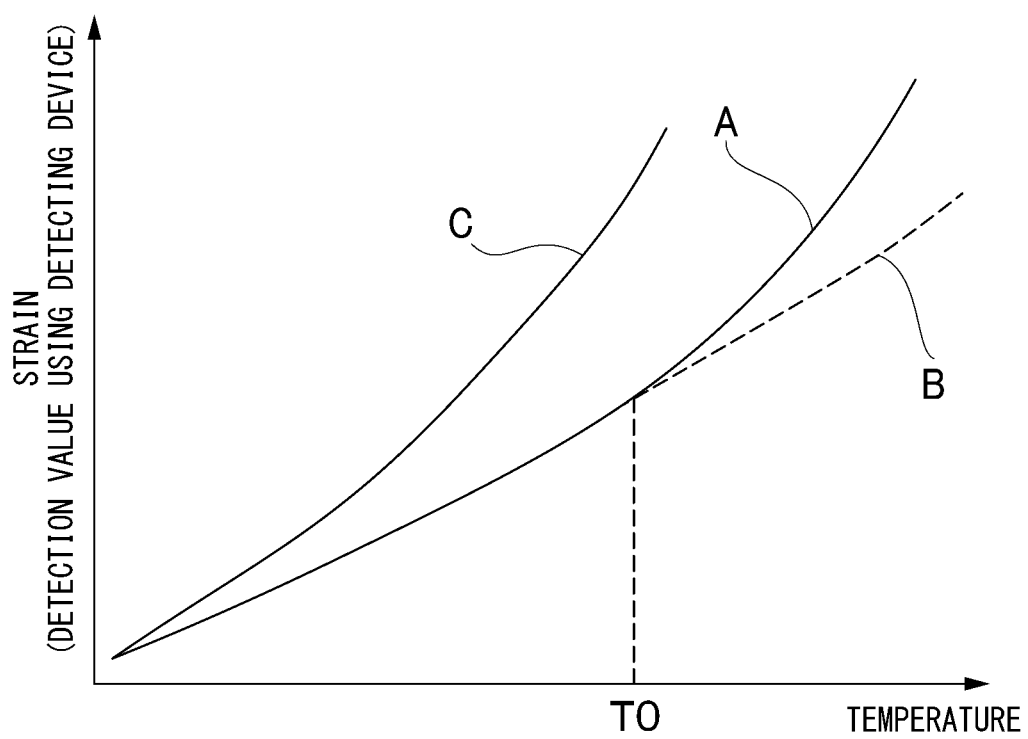
FIG. 7 is a graph representing a relationship between physical properties and a temperature of an optical fiber.

A fourth embodiment of the present disclosure will be described below with reference to FIGS. 5 to 7. Constituent elements of the fourth embodiment that are the same as those of the first to third embodiments will be denoted with the same reference numerals as in the first to third embodiments and detailed description thereof will be omitted. As shown in FIG. 5, in this embodiment, a plurality of (for example, two) welding sections 6 are provided at intervals in a direction in which an optical fiber 3 extends. The optical fiber 3 is fixed to a metal foil 52 as a metal covering 5 using the welding sections 6. A portion between the welding sections 6 in the middle of the extension of the optical fiber 3 is a bent section 3P in a state in which the tension of the optical fiber 3 is negative. On the other hand, portions of the bent section 3P which have the welding sections 6 therebetween and are opposite to each other are extension sections 3S. It is desirable that the extension sections 3S be bent as in the bent section 3P or more than the bent section 2P.

Here, as in the above-described second embodiment, A. an amount of response change based on a linear expansion difference between an object 90 to be measured and the optical fiber 3, B. an amount of response change due to temperature change of the optical fiber 3 (that is, a sum of an amount of response change due to thermal expansion of the optical fiber 3 and an amount of response change due to a refractive index change), and C. a mechanical strain of the object 90 to be measured are assumed. In a state in which the optical fiber 3 is not bent (that is, a state in which tension is 0 or higher), if a temperature of the object 90 to be measured is raised, an input to the optical fiber 3 is A+B+C. On the other hand, in a case in which the optical fiber 3 is bent in advance as in the above constitution, when a temperature of the object 90 to be measured is raised and the object 90 to be measured thermally expands, the bending is gradually eliminated and the above-mentioned tension is 0 or higher when the temperature reaches a certain reference temperature TO (refer to FIG. 7). After that, an amount of strain to be detected is as indicated by a curve A shown in FIG. 7. (On the other hand, when the optical fiber 3 is not bent in advance, the amount of strain to be detected is as indicated by the curve C as shown in FIG. 7.) That is to say, in a state before the temperature reaches the reference temperature TO, only B described above is input to the optical fiber 3 and A and C are not input to the optical fiber 3. In a state after the temperature reaches the reference temperature TO, a state in which A, B, and C described above are input is obtained. As a result, even at a relatively high temperature, it is possible to perform measurement without reaching a measurement limit of the optical fiber.

A method for detecting a mechanical strain using the above-described optical fiber detecting device 70 will be described below with reference to FIG. 6. In this method, the above-described optical fiber detecting device 70 is calibrated before being put into a real environment. As shown in FIG. 6, this method includes a first installing step S1, a test piece heating step S2, a correction curve obtaining step S3, a second installing step S4, a physical property obtaining step S5, and a subtracting step S6.

In the first installing step S1, the optical fiber detecting device 70 is attached to a test piece made of the same material as the object 90 to be measured. In the test piece heating step S2, a temperature of the test piece is raised until the bending of the optical fiber 3 is eliminated and a state in which thermal expansion has occurred is obtained. In the correction curve obtaining step S3, a relationship (a correction curve) between the temperature of the test piece and a physical property (A+B described above) of the optical fiber 3 is obtained. Subsequently, the optical fiber detecting device 70 is removed from the test piece and attached to a surface of the object 90 to be measured (the second installing step S4). Subsequently, a temperature of the object 90 to be measured and a physical property (A+B+C described above) of the optical fiber 3 are detected (the physical property obtaining step S5). Finally, a mechanical strain (C described above) occurring in an object to be measured is obtained by subtracting the physical property of the optical fiber 3 detected above the test piece from the physical property of the optical fiber 3 detected above the object 90 to be measured (the subtracting step S6).

In the above method, first, the optical fiber detecting device 70 is attached to the test piece, the temperature of the test piece is raised until a state in which the bending of the optical fiber 3 is eliminated and thermal expansion occurs is obtained. In this state, a relationship between the temperature of the test piece and the physical property of the optical fiber 3 is obtained. Since a mechanical strain does not occur or negligibly slightly occurs in the test piece, a value of A+B described above is obtained through this step. Subsequently, the optical fiber detecting device 70 is attached to the object 90 to be measured and a temperature of the object 90 to be measured and a physical property of the optical fiber 3 are detected. Since a mechanical strain occurs in the object 90 to be measured, A+B+C described above is obtained through this step. Finally, it is possible to obtain C (a mechanical strain) by subtracting the value of A+B described above obtained using the test piece from A+B+C described above. In this way, according to the method, it is possible to accurately and easily detect and measure a mechanical strain of the object 90 to be measured in a state in which an influence of linear expansion (thermal expansion) of the optical fiber 3 itself is excluded in advance.

Fifth Embodiment

Figure 8:
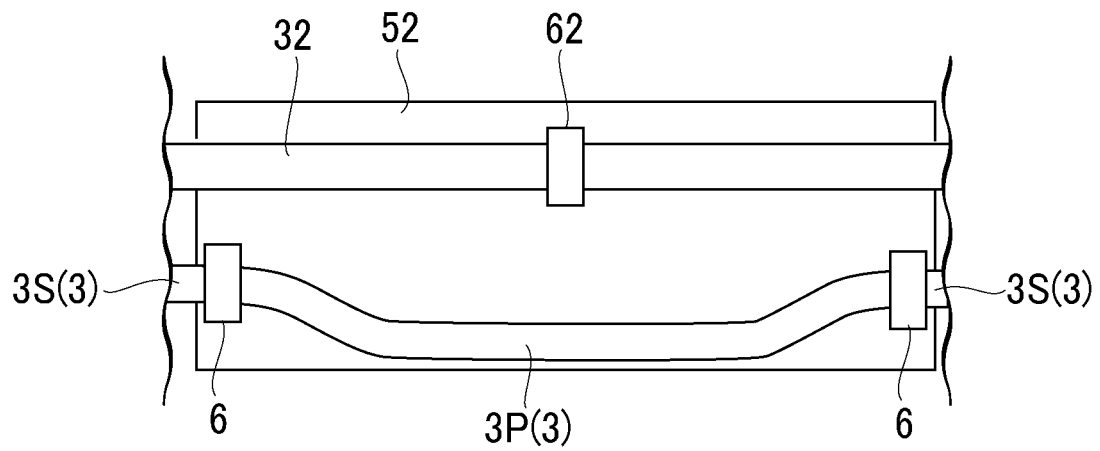
FIG. 8 is a plan view showing a constitution of an optical fiber detecting device according to a fifth embodiment of the present disclosure.

A fifth embodiment of the present disclosure will be described below with reference to FIG. 8. Constituent elements of the fifth embodiment that are the same as those of the first to fourth embodiments will be denoted with the same reference numerals as in the first to fourth embodiments and detailed description thereof will be omitted. As shown in FIG. 8, in this embodiment, the constituent elements described in the fourth embodiment and an optical fiber 32 for linear expansion measurement are installed together in addition to an optical fiber 3 as a main fiber 31. The optical fiber 32 for linear expansion measurement is fixed to only one point of a metal foil 52 using welding sections 62 and is laid in a state in which both sides (welding sections 62) corresponding to a fixing section are bent.

Here, as in the above-described second embodiment, A. an amount of response change based on a linear expansion difference between an object to be measured and an optical fiber, B. an amount of response change due to a temperature change of an optical fiber (that is, a sum of an amount of response change due to thermal expansion of an optical fiber and an amount of response change due to a refractive index change), and C. a mechanical strain of an object to be measured are assumed. In a case in which the optical fiber 3 is bent in advance as in the above constitution, when a temperature of the object 90 to be measured is raised and thermal expansion occurs in the object 90 to be measured, the bending is gradually eliminated and the above-described tension is 0 or higher at a time at which the temperature reaches a certain reference temperature. That is to say, in a state before the temperature reaches the reference temperature, only B described above is input to the optical fiber 3 and A and C are not input to the optical fiber 3. In a state after the temperature reaches the reference temperature, a state in which A, B, and C described above are input is obtained. That is to say, in a region having a temperature higher than the reference temperature, A+B+C is obtained. Here, since a value of B is obtained using the detection results of the optical fiber 32 for linear expansion measurement, the temperature of the object 90 to be measured corresponding to B is obtained using the function. Furthermore, A is obtained using this temperature and a physical property of the object 90 to be measured. Therefore, it is possible to calculate a value of C. In this way, according to the above constitution, it is possible to accurately and easily detect and measure a mechanical strain of the object 90 to be measured in a state in which an influence of linear expansion (thermal expansion) of the optical fiber 3 itself is excluded in advance.

Although the embodiments of the present disclosure have been described in detail above with reference to the drawings, a detailed constitution is not limited to the embodiments and includes a design change or the like without departing from the gist of the present disclosure. For example, in each of the above embodiments, as the object 90 to be measured, a high-temperature member of a gas turbine is described as an example. However, the object 90 to be measured is not limited to the gas turbine, and any mechanical device can also be applied as the object 90 to be measured as long as the mechanical device is a mechanical device in which a strain occurs when the gas turbine is in a high temperature state.

<Supplementary Note>

The optical fiber detecting device and the method for detecting a mechanical strain using the optical fiber detecting device described in each embodiment are grasped, for example, as follows.

(1) An optical fiber detecting device 70 according to a first aspect includes an optical fiber 3 configured to extend in contact with the surface 90S of the object 90 to be measured, a metal covering 5 configured to cover a part of the optical fiber in an extending direction of the optical fiber 3 from an outside of the object 90 to be measured, a fixing section 4 configured to fix an inner surface of the metal covering 5 and the optical fiber 3, and welding sections 6 configured to fix the metal covering 5 to the object to be measured at positions interposing the optical fiber 3 in a direction intersecting the extending direction of the optical fiber 3 extends.

According to the above constitution, the inner surface of the metal covering 5 is fixed to the optical fiber 3 using a fixing section and the metal covering 5 is fixed to the object 90 to be measured using the welding sections 6. Thus, it is possible to more firmly fix the optical fiber 3 by pressing the optical fiber 3 against the surface 90S of the object 90 to be measured.

(2) An optical fiber detecting device 70 according to a second aspect further includes an optical fiber 32 for linear expansion measurement which is provided together with the optical fiber 3 and in which at least a part thereof is attached to the surface 90S of the object 90 to be measured in a state in which only its own thermal expansion according to a temperature change of the object 90 to be measured is allowed.

Here, the optical fiber detecting device 70 detects the following physical quantities. First, a laser L is incident on the optical fiber 3 from the light source 1 provided at one end thereof in a direction in which the optical fiber 3 extends. The laser L generates Rayleigh scattered light Lr in each part of the optical fiber 3. An amount of wavelength to shift is obtained in each part of the optical fiber 3 by detecting the Rayleigh scattered light Lr using the detecting device 80 and comparing the detected Rayleigh scattered light Lr with a reference light Lc serving as a reference. The amount of wavelength to shift is a function in which an influence of a temperature change of the optical fiber 3 itself, expansion (a strain) of the object 90 to be measured, and the like are used as variables. To be more specific, the amount of wavelength to shift includes A. an amount of response change based on a linear expansion difference between the object 90 to be measured and the optical fiber 3, B. an amount of response change due to a temperature change of the optical fiber 3 (that is, a sum of an amount of response change due to thermal expansion of the optical fiber 3 and an amount of response change due to a refractive index change), and C. a mechanical strain of the object 90 to be measured.

When the optical fiber 3 is fixed to the object 90 to be measured, a value obtained by summing A, B, and C described above is detected as an amount of wavelength to shift. That is to say, it is difficult to obtain only C. the mechanical strain. Thus, in the above constitution, the optical fiber 32 for linear expansion measurement is further provided. At least a part of the optical fiber 32 for linear expansion measurement is attached in a state in which only its own thermal expansion (that is, B described above) based on a temperature change of the object 90 to be measured is allowed. Here, if an input to the optical fiber 32 for linear expansion measurement is only a temperature, an amount of wavelength to shift is a function of only a temperature. For this reason, it is possible to obtain a temperature of the object 90 to be measured from B described above using this function. Furthermore, it is possible to also calculate A. an amount of response change based on a linear expansion difference between the object to be measured and the optical fiber 3 input to the optical fiber 3 on the basis of the temperature. It is possible to obtain C. a mechanical strain of the object to be measured by subtracting a sum of the amounts of response change of A and B obtained in this way from an amount of wavelength to shift (a sum of A, B, and C) obtained using the optical fiber 3. That is to say, it is possible to accurately obtain only a mechanical strain of the object 90 to be measured in a state in which an influence of a temperature change of the optical fiber 3 itself is excluded.

(3) In an optical fiber detecting device 70 according to a third aspect, the optical fiber 32 for linear expansion measurement is held by a heat-conductive holding section 7 which is provided between the optical fiber 32 for linear expansion measurement and the inner surface of the metal covering 5 and by which displacement of the optical fiber 32 for linear expansion measurement in a direction in which the optical fiber 32 for linear expansion measurement extends is allowed.

According to the above constitution, the displacement of the optical fiber 32 for linear expansion measurement in a direction in which the optical fiber 32 for linear expansion measurement extends is allowed by the heat-conductive holding section 7. Therefore, the optical fiber 32 for linear expansion measurement is in a state in which its own thermal expansion based on a temperature change of the object 90 to be measured is allowed. Thus, it is possible to accurately obtain only a mechanical strain of the object 90 to be measured by comparing an amount of response due to the optical fiber 32 for linear expansion measurement with an amount of response due to the optical fiber 3.

(4) In an optical fiber detecting device 70 according to a fourth aspect, the metal covering 5 is made of the same metal material as the object 90 to be measured and a portion (a free section 52F) of the metal covering 5 located between the optical fiber 32 for linear expansion measurement and the object 90 to be measured is in contact with the surface 90S of the object 90 to be measured in a displaceable state.

Here, A. an amount of response change based on a linear expansion difference between the object 90 to be measured and the optical fiber 3, B. an amount of response change due to a temperature change of the optical fiber 3 (that is, a sum of an amount of response change due to thermal expansion of the optical fiber 3 and an amount of response change due to a refractive index change), and C. a mechanical strain of the object 90 to be measured are assumed. According to the above constitution, the portion of the metal covering 5 located between the optical fiber 32 for linear expansion measurement and the object 90 to be measured is in contact with the surface of the object 90 to be measured in a displaceable state. Therefore, the optical fiber 32 for linear expansion measurement is in a state in which only its own thermal expansion based on a temperature change of the object 90 to be measured is allowed. Here, it is assumed that an amount of response change due to a linear expansion difference between the object 90 to be measured and the metal covering 5 is A1 and an amount of response change due to a linear expansion difference between the metal covering 5 and the optical fiber 3 is A2. Thus, an input to the optical fiber 32 for linear expansion measurement is a sum of A2 and B. an amount of response change due to a temperature change of the optical fiber 32 for linear expansion measurement. On the other hand, an input to the optical fiber 3 is a sum of A. an amount of response change based on a linear expansion difference between the object 90 to be measured and the optical fiber 3, B. an amount of response change due to a temperature change of the optical fiber 3 for linear expansion measurement (that is, a sum of an amount of response change due to thermal expansion of the optical fiber 3 and an amount of response change due to a refractive index change), and C. a mechanical strain of the object 90 to be measured. That is to say, a relationship between the following Expression (1) and Expression (2) is established:

$$(\text{Input to optical fiber}) = A + B + C \quad (1), \text{ and}$$

$$(\text{Input to optical fiber for linear expansion measurement}) = A2 + B \quad (2).$$

Here, if a difference between Expression (1) and Expression (2) is obtained, the following Expression (3) is obtained:

$$\text{Expression (1)} - \text{Expression (2)} = (A + B + C) - (A2 + B) \quad (3)$$
$$= C + (A - A2).$$

Since A−A2=A1 is obtained from the above definition, a relationship of Expression (4) is established:

$$C + (A - A2) = C + A1 \quad (4).$$

Since the metal covering 5 and the object 90 to be measured are made of the same material in the above constitution, A1 (the amount of response change due to the linear expansion difference between the object 90 to be measured and the metal covering 5) is zero. That is to say, it is possible to obtain a value of C from Expression (4) by obtaining a difference between Expression (1) and Expression (2) as described above. In this way, it is possible to accurately obtain only a mechanical strain of the object 90 to be measured by comparing an amount of response due to the optical fiber 32 for linear expansion measurement with an amount of response due to the optical fiber 3.

(5) An optical fiber detecting device 70 according to a fifth aspect includes a plurality of the welding sections 6 arranged at intervals in a direction in which the optical fiber 3 extends and a portion of the optical fiber between the welding sections 6 is attached while bent.

Here, A. an amount of response change based on a linear expansion difference between the object 90 to be measured and the optical fiber 3, B. an amount of response change due to a temperature change of the optical fiber 3 (that is, a sum of an amount of response change due to thermal expansion of the optical fiber 3 and an amount of response change due to a refractive index change), and C. a mechanical strain of the object 90 to be measured are assumed. In a state in which the optical fiber 3 is not bent (that is, a state in which tension thereof is 0 or higher), if a temperature of the object 90 to be measured is raised, an input to the optical fiber 3 is A+B+C. On the other hand, in a state in which the optical fiber 3 is bent in advance as in the above constitution, when a temperature of the object 90 to be measured is raised and thermal expansion occurs in the object 90 to be measured, the bending is gradually eliminated and the above-described tension is 0 or higher at a time at which the temperature reaches a certain reference temperature. That is to say, in a state before the temperature reaches the reference temperature, only B and C described above are input to the optical fiber 3 and A is not input to the optical fiber 3. In a state after the temperature reaches the reference temperature, a state in which A, B, and C described above are input is obtained. As a result, it is possible to perform measurement in a wide temperature range without reaching a measurement limit of the optical fiber 3 even at a relatively high temperature.

(6) An optical fiber detecting device 70 according to a sixth aspect further includes an optical fiber 32 for linear expansion measurement which is installed together with the optical fiber 3, fixed to only one point of the metal covering 5, and attached in a state in which both sides of the fixed point are bent.

Here, A. an amount of response change based on a linear expansion difference between the object 90 to be measured and the optical fiber 3, B. an amount of response change due to a temperature change of the optical fiber 3 (that is, a sum of an amount of response change due to thermal expansion of the optical fiber 3 and an amount of response change due to a refractive index change), and C. a mechanical strain of the object 90 to be measured are assumed. In a case in which the optical fiber 3 is bent in advance as in the above constitution, when a temperature of the object 90 to be measured is raised and thermal expansion occurs in the object 90 to be measured, the bending is gradually eliminated and the above-described tension is 0 or higher at a time at which the temperature reaches a certain reference temperature. That is to say, in a state before the temperature reaches the reference temperature, only B and C described above are input to the optical fiber 3 and A is not input to the optical fiber 3. In a state after the temperature reaches the reference temperature, a state in which A, B, and C described above are input is obtained. On the other hand, the optical fiber 32 for linear expansion measurement is in a state in which only B is constantly input to the optical fiber 32 for linear expansion measurement. Therefore, in a region having a temperature lower than a reference temperature, C is obtained by subtracting the detection result of the optical fiber 32 for linear expansion measurement from the detection result using the optical fiber 3. On the other hand, in a region having a temperature higher than a reference temperature, A+C is obtained. Here, since a value of B is provided using the detection result of the optical fiber 32 for linear expansion measurement, a temperature of the object 90 to be measured corresponding to B is obtained using a function. Furthermore, A is obtained using the temperature and a physical property of the object 90 to be measured. Therefore, it is possible to calculate a value of C.

(7) A method for detecting a mechanical strain using an optical fiber detecting device 70 according to a seventh aspect is a method for detecting a mechanical strain using the optical fiber detecting device 70 according to the fifth aspect which includes a step S1 of attaching the optical fiber detecting device 70 to a test piece formed made of the same material as the object 90 to be measured, a step S2 of raising a temperature of the test piece until the bending of the optical fiber 3 is eliminated and thermal expansion occurs, a step S3 of obtaining a relationship between the temperature of the test piece and a physical property of the optical fiber 3, a step S4 of removing the optical fiber detecting device 70 from the test piece and attaching the optical fiber detecting device 70 to the surface 90S of the object 90 to be measured, a step S5 of detecting a temperature of the object 90 to be measured and the physical property of the optical fiber 3, and a step S6 of obtaining a mechanical strain occurring in the object 90 to be measured by subtracting the physical property of the optical fiber 3 detected on the test piece from a physical property of the optical fiber 3 detected on the object 90 to be measured.

Here, A. an amount of response change based on a linear expansion difference between the object 90 to be measured and the optical fiber 3, B. an amount of response change due to a temperature change of the optical fiber 3 (that is, a sum of an amount of response change due to thermal expansion of the optical fiber 3 and an amount of response change due to a refractive index change), and C. a mechanical strain of the object 90 to be measured are assumed. In the above method, first, the optical fiber detecting device 70 is attached to the test piece and a temperature of the test piece is raised until a state in which the bending of the optical fiber 3 is eliminated and thermal expansion occurs is obtained. In this state, a relationship between the temperature of the test piece and the physical property of the optical fiber 3 is obtained. Since a mechanical strain does not occur or is negligibly small in the test piece, a value of A+B described above is obtained through this step. Subsequently, the optical fiber detecting device 70 is attached to the object 90 to be measured and the temperature of the object 90 to be measured and the physical property of the optical fiber 3 are detected. Since a mechanical strain occurs in the object 90 to be measured, A+B+C described above is obtained through this step. Finally, it is possible to obtain C (a mechanical strain) by subtracting the value of A+B obtained using the test piece from A+B+C.

EXPLANATION OF REFERENCES

100 Optical fiber detecting system
1 Light source
2 Spectroscope
3 Optical fiber
31 Main fiber
32 Optical fiber for linear expansion measurement
3P bent section
3S Extension section
4 Fixing section
5, 51 Metal cover
52 Metal foil
52F Free section
6, 61, 62 welding section
7 Heat-conductive holding section
70 Optical fiber detecting device
80 Detecting device
90 Object to be measured
90S Surface
C Cutout section
L Laser
Lc Reference light
Lr Scattered light

What is claimed is:

1. An optical fiber detecting device, comprising:
an optical fiber configured to extend along a surface of an object to be measured;
a metal covering configured to cover a part of the optical fiber in an extending direction of the optical fiber from an outside of the object to be measured;
a fixing section configured to fix an inner surface of the metal covering and the optical fiber;
welding sections configured to fix the metal covering to the object to be measured at positions interposing the optical fiber in a direction intersecting the extending direction of the optical fiber; and
an optical fiber for linear expansion measurement which is provided together with the optical fiber, wherein
at least a part of the optical fiber for linear expansion measurement is attached to the surface of the object to be measured in a state in which only its own thermal expansion according to a temperature change of the object to be measured is allowed.

2. The optical fiber detecting device according to claim 1, wherein the optical fiber for linear expansion measurement is held by a heat-conductive holding section,
the heat-conductive holding section is provided between the optical fiber for linear expansion measurement and the inner surface of the metal cover, and
the heat-conductive holding section allows a displacement of the optical fiber for linear expansion measurement in an extending direction of the optical fiber for linear expansion measurement.

3. The optical fiber detecting device according to claim 1, wherein the metal covering is made of the same metal material as the object to be measured, and
a portion of the metal covering located between the optical fiber for linear expansion measurement and the object to be measured is in contact with the surface of the object to be measured in a displaceable state.

4. An optical fiber detecting device, comprising:
an optical fiber configured to extend along a surface of an object to be measured;
a metal covering configured to cover a part of the optical fiber in an extending direction of the optical fiber from an outside of the object to be measured;
a fixing section configured to fix an inner surface of the metal covering and the optical fiber; and
welding sections configured to fix the metal covering to the object to be measured at positions interposing the optical fiber in a direction intersecting the extending direction of the optical fiber, wherein
a plurality of the welding sections is arranged at intervals in the extending direction of the optical fiber, and
a portion of the optical fiber between the welding sections is attached while bent.

5. The optical fiber detecting device according to claim 4, further comprising:
an optical fiber for linear expansion measurement which is installed together with the optical fiber, fixed to only one point of the metal cover, and attached in a state in which both sides of the fixed point are bent.

6. A method for detecting a mechanical strain using the optical fiber detecting device according to claim 4, comprising:
- a step of attaching the optical fiber detecting device to a test piece made of the same material as an object to be measured;
- a step of raising a temperature of the test piece until the bending of the optical fiber is eliminated and thermal expansion occurs in the object to be measured;
- a step of obtaining a relationship between the temperature of the test piece and physical properties of the optical fiber;
- a step of removing the optical fiber detecting device from the test piece and attaching the optical fiber detecting device to a surface of the object to be measured;
- a step of detecting a temperature of the object to be measured and the physical properties of the optical fiber; and
- a step of obtaining a mechanical strain occurring in the object to be measured by subtracting the physical properties of the optical fiber detected on the test piece from the physical properties of the optical fiber detected on the object to be measured.

* * * * *